Sept. 17, 1968  J. O. KNIGHT  3,401,447
SNAP ACTION METHOD OF SECURING A HOSE FITTING TO A HOSE END
Original Filed May 1, 1964                                     2 Sheets-Sheet 1

INVENTOR
JAMES O. KNIGHT

BY
Cushman, Darby & Cushman
ATTORNEY

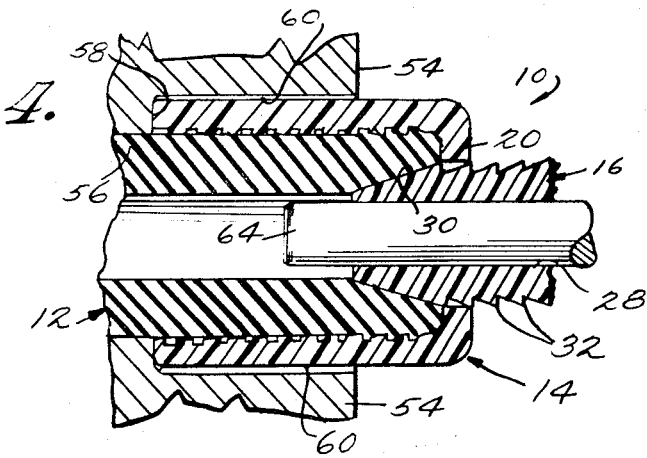
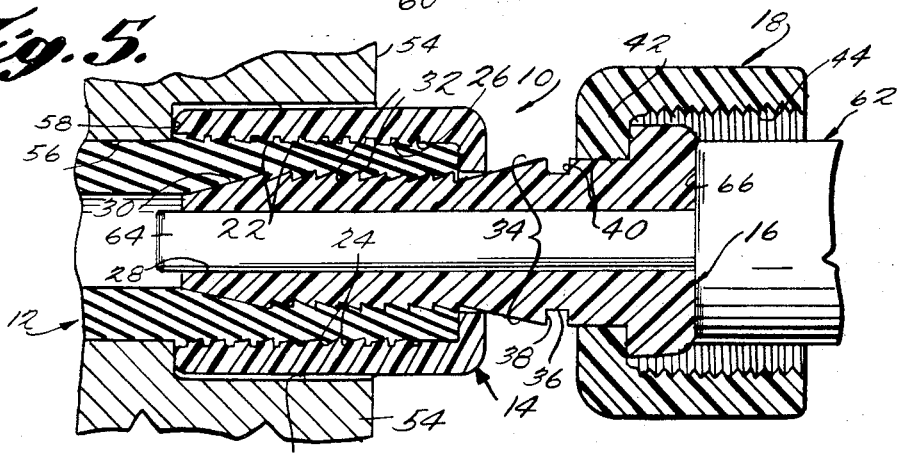
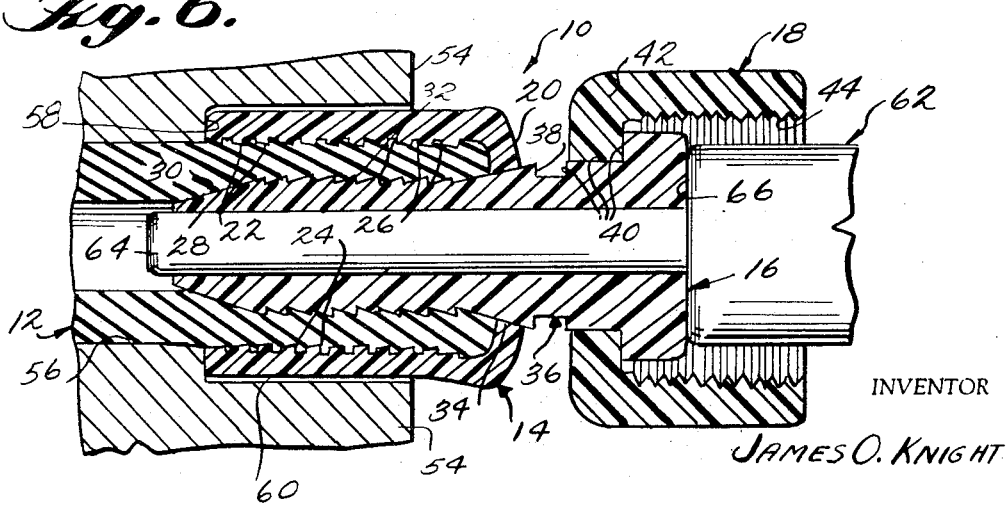

United States Patent Office 3,401,447
Patented Sept. 17, 1968

3,401,447
SNAP ACTION METHOD OF SECURING A HOSE FITTING TO A HOSE END
James O. Knight, Peoria, Ill., assignor to L. R. Nelson Mfg. Co., Inc., Peoria, Ill., a corporation of Illinois
Original application May 1, 1964, Ser. No. 364,182, now Patent No. 3,262,721, dated July 26, 1966. Divided and this application May 20, 1966, Ser. No. 551,649
2 Claims. (Cl. 29—450)

This application constitutes a division of my copending application, Ser. No. 364,182, filed May 1, 1964, entitled, "Snap Action Hose Fitting," which issued July 26, 1966, as Patent No. 3,262,721.

This invention relates to the securement of hose fittings to hose ends and more particularly to an improved method of securing a hose fitting of the type which is made either entirely of plastic or includes one or more major plastic components to a hose end.

The provision of an effective hose fitting which embodies one or more major plastic components is regarded by the industry to be highly desirable. However, for a considerable period of time the industry has not fully accepted any of the plastic component hose fittings which have been commercially offered. In the past, these fittings have presented problems of performance which appear to have created a resistance to the acceptance of any hose fitting embodying major plastic components.

It is an object of the present invention to provide an effective method of securing to a hose end a hose fitting embodying at least one major component which is made of plastic material in which the other major components may also be made of plastic material.

Another object of the present invention is the provision of a method of the type described which utilizes the elastic properties of the hose fitting to effectively secure the hose fitting components on the hose end with a snap action.

Still another object of the present invention is the provision of an improved method for effecting the securement of the hose fitting to the hose end which is simple and effective in operation and economical to perform.

These and other objects of the present invention will become more apparent during the course of the following detailed description and appended claims.

The invention may best be understood with reference to the accompanying drawings wherein an illustrative embodiment is shown.

In the drawings:

FIGURE 4 is a view similar to FIGURE 1 illustrating a second stage in the securement of the hose fitting to the hose end;

FIGURE 5 is a view similar to FIGURE 1 illustrating a third stage in the securement of the hose fitting to the hose end; and FIGURE 6 is a view similar to FIGURE 1 illustrating a fourth stage in the securement of the hose fitting to the hose end.

Figure 2:
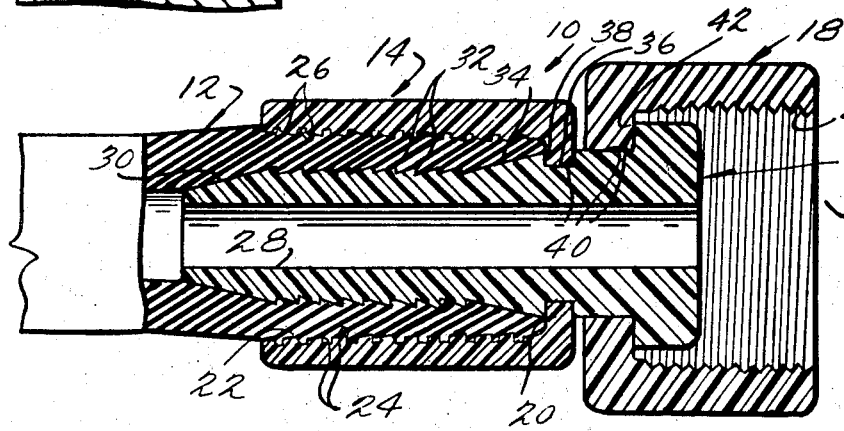
FIGURE 2 is a vertical sectional view of a female hose fitting showing the same in secured engagement on the end of a hose in accordance with the principles of the present invention.

Referring now more particularly to FIGURE 2, there is shown therein a female hose fitting, generally indicated at 10, secured or operatively attached to the end of a hose, generally indicated at 12, in accordance with the principles of the present invention.

The female hose fitting 10 includes three major components: one, an outer sleeve 14; two, an inner tubular member 16; and three, a fitting sleeve 18. The outer sleeve is made of a material which is capable of a relatively great deflection or deformation within the elastic limit of the material. A preferred material is a linear, high molecular weight, stable, moldable, homopolymeric, oxymethylene, for example, as described in MacDonald Patent No. 2,768,994. Polycarbonates may also be used to good advantage. The preferred materials are available commercially under the trademarks Delrin and Celcon.

Figure 1:
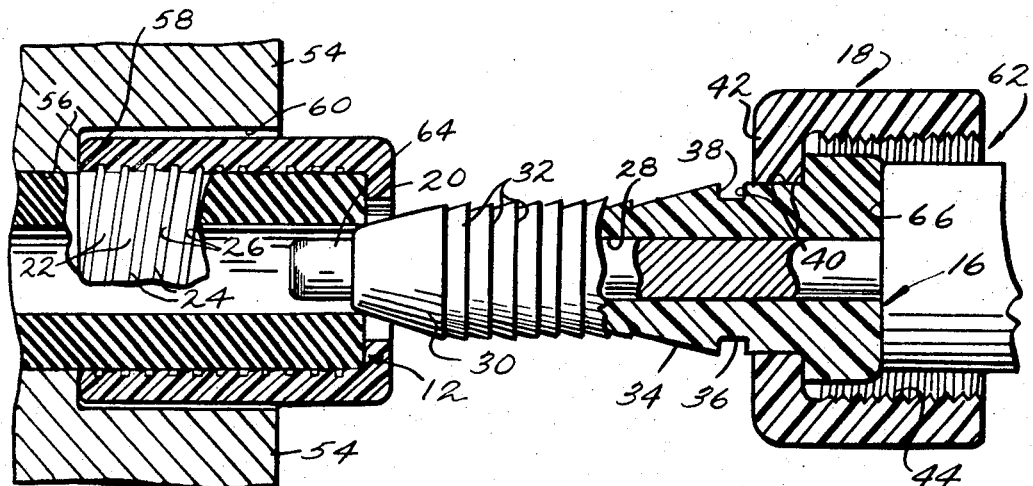
FIGURE 1 is a vertical sectional view, partly in elevation, illustrating the initial step in securing a hose fitting on the end of a hose in accordance with the principles of the present invention.

As shown, the outer sleeve 14 comprises essentially a cylindrical member having its inner peripheral surface interrupted and an annular flange 20 extending radially inwardly from one end thereof. As best shown in FIGURE 1, the interrupted interior peripheral surface of the sleeve 14 is preferably in the form of a helical ridge 22. The ridge is formed by a pair of angularly related surfaces as, for example, 75°, which define at their juncture a sharp helical edge 24 facing in the direction of the flange 20. Preferably, in the example given above, the interior peripheral surface defining the ridge 22 is disposed at an angle of approximately 15° with respect to the axis of the sleeve whereas the other surface is disposed at approximately 90° or extends radially with respect to the axis of the sleeve. Further, in the example shown in the drawings and described above, a helical groove 26 is formed adjacent the radial surface of the annular ridge which defines the sharp edge 24.

As shown in FIGURE 1, the interior peripheral size of the interrupted surface provided by the ridge 22 is such as to receive and engage over the outer peripheral surface of the end of the hose 12. As shown, the interior peripheral diameter of the sleeve is approximately equal to the exterior diameter size of the hose, although it will be understood that the hose may be slightly oversize or undersize with respect to the sleeve. The flange 20 is adapted to engage the outer extremity or edge of the hose end and the interior peripheral diameter size of the flange is less than the outer peripheral diameter size of the hose and greater than the interior peripheral diameter size of the hose.

The inner tubular member 16 and fitting sleeve 18 are likewise preferably made of a plastic material such as Delrin or Celcon; however, they can be also made of other plastic materials as well as metallic materials. The inner tubular member 16 is provided with a flow passage 28 which extends completely therethrough, the diameter size of the passage being slightly less than the interior diameter size of the hose 12. At one end of the inner tubular member 16 there is included a first outer peripheral portion in the form of a tapering surface 30 specifically of frusto-conical configuration. The outer extremity of the tapering surface 30 preferably has a diameter size less than the interior diameter size of the hose 12. From its outer extremity, the tapering surface 30 diverges inwardly and terminates in a diameter size greater than the interior diameter size of the hose and generally equal to or slightly less than the interior diameter size of the flange 20.

The inner tubular member 16 includes a second outer peripheral portion in the form of an interrupted surface specifically provided by a plurality of contiguous annular ridges 32. As shown, each annular ridge is formed by a pair of intersecting angularly related surfaces as, for example, approximately 75°. As shown, one of the surfaces is disposed at an angle of approximately 15° with respect to the axis of the tubular member 16 while the other surface is disposed at an angle of approximately 90° or extends radially with respect to the axis of the tubular member. The surfaces forming the annular ridges 32 thus define sharp annular edges which face in a direction opposed to the tapering surface 30. It will be noted that the second outer peripheral portion defined by the ridges 32 is adjacent to the first outer peripheral portion defined by the surface 30 and that the diameter size of the ridges 32 is approximately equal to the large diameter size of the tapering surface 30. Thus, the ridges are of a diameter size greater than the interior diameter size of the hose but generally equal to or slightly less than the interior diameter size of the flange 20.

The tubular member 16 also includes a third outer peripheral portion formed by a tapering surface 34 specifically of frusto-conical configuration. As shown, the end of the surface 34 is adjacent the ridge 32 remote from the tapering surface 30 and has a diameter size which is less than the diameter size of the interior periphery of the flange 20. The tapering surface 34 diverges in a direction away from the ridges 32 and terminates in a diameter size which is greater than the interior diameter size of the flange 20.

The inner tubular member 16 includes a fourth outer peripheral portion which is formed by a peripheral surface 36 and an abutment surface 38 extending transversely between the peripheral surface 36 and the adjacent end of the tapering surface 34. The peripheral surface 38 is of a diameter size to receive the flange 20.

Finally, the inner tubular member 16 includes a fifth outer peripheral portion which, in the case of the female fitting now being described, is in the form of a stepped surface 40. The first step of the surface 40 defines with the surfaces 36 and 38 an annular locking groove which receives the flange 20 of the outer sleeve. The second step defines with the outer portion of the flange 20 of the sleeve 14 an annular groove, of a diameter size greater than the diameter size of the flange receiving groove, which is adapted to swively or rotatably receive an annular flange 42 extending radially inwardly from one end of the fitting sleeve 18. As shown, the interior periphery of the fitting sleeve 18 is provided with conventional screw threads 44.

Figure 3:
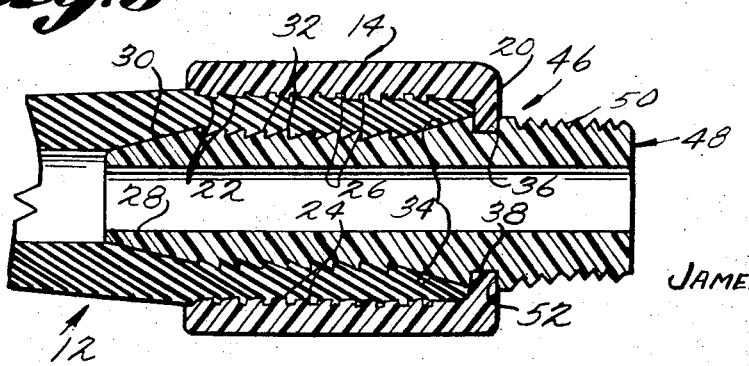
FIGURE 3 is a view similar to FIGURE 2 illustrating a male hose fitting in secured engagement on the end of a hose in accordance with the principles of the present invention.

Referring now more particularly to FIGURE 3, there is shown therein a male fitting, generally indicated at 46, which includes an outer sleeve 14 of a construction substantially identical with the construction of the outer sleeve 14 previously described. Rather than including two other major components as was the case with respect to the female fitting 10, the male fitting 46 includes only one other major component, namely an inner tubular member 48. The inner tubular member 48 is constructed of a material and with a configuration substantially identical with that of the inner tubular member 16, except for the fifth outer peripheral portion. As shown in FIGURE 3, the fifth outer peripheral portion of the inner tubular member 48 is formed by a conventional exterior screw thread 50 which is of a diameter size to co-act with the threads 44, thus providing a radial surface 52 which defines with the surfaces 36 and 38 an annular groove which receives the flange 20 of the outer sleeve 14.

Except for the initial requirement of engaging the fitting sleeve 18 on the outer tubular member 16, the manner in which both the female fitting 10 and the male fitting 46 are secured to the hose end in accordance with the principles of the present invention is identical, so that a description of one will suffice to give a clear understanding of both.

Method and operation

Referring now more particularly to FIGURES 1 and 4–6, the securement of the fitting 10 to the hose end is preferably accomplished through the use of suitable equipment. For example, as shown, such equipment may include a pair of jaws 54 mounted for movement toward and away from each other between a hose-receiving position and a hose-engaging position. When the jaws are in the latter position, they include an inwardly spaced annular surface 56 of a diameter size somewhat less than the outer diameter size of the hose, so as to firmly grip the same and hold it against inward movement. Formed adjacent the outer end of the surface 56 is an annular abutment surface 58 which extends radially outwardly therefrom. The outer end of the abutment surface 58 merges with the inner end of an outer annular surface 60 of a diameter size greater than the exterior peripheral diameter size of the outer sleeve 14.

The aforesaid equipment may also include a plunger member 62 which is mounted for movement toward and away from the jaws 54 in axial alignment with the annular surfaces 56 and 60. As shown, the plunger member includes a main body portion of a diameter size to engage within the fitting sleeve 18 and an outer pin portion 64 of a diameter size to engage within the passage 28 of the inner tubular member 16 and which defines with the main body portion an annular abutment shoulder 66 for engaging the end of the inner tubular member opposite from the tapering surface 30.

It will be understood that prior to the actual securing operation, outer sleeve 14 is engaged over the end of the hose 12 until the flange 20 is in abutting relation to the outer extremity of the hose. The jaws 54 are then closed onto the hose, so as to grip the same with the inner end of the outer sleeve 14 in engagement with the abutment surface 58. The inner tubular member 16 is engaged over the pin portion 64 until the end thereof engages the abutment surface 66. With the component parts of the fitting 10 initially positioned as indicated above and shown in FIGURE 1, a relative axial movement between the jaws 54 and the plunger 62 is effected in a direction to engage the inner tubular member 10 within the adjacent end of the hose and the outer sleeve 14 engaged thereover.

As best shown in FIGURE 1, it will be noted that, since the minor diameter size of the frusto-conical surface 30 is less than the interior diameter size of the hose 12, the leading end of the inner tubular member will readily engage within the outer extremity of the hose. Referring now more particularly to FIGURE 4, it will be seen that as the inner tubular member 16 moves inwardly, the hose end will be progressively expanded radially outwardly so that the outer periphery of the hose expands into conformed engagement with the irregular surface on the interior of the outer sleeve 14. Continued inward movement of the tubular member 16 with respect to the hose end and the outer sleeve 14 engaged therein will serve to bring the irregular surface defined by the ridges 32 into engagement with the interior surface of the hose while at the same time maintaining the contiguous outer periphery of the hose, which has been progressively expanded by the surface 30, into expanded relation to the interior irregular surface of the outer sleeve member.

It will be noted that because of the sawtooth-like configuration of the irregular surfaces provided both by the ridge 22 and ridges 32, the inward movement of the tubular member 16 with respect to the hose is facilitated while the outward movement is specifically prevented and conversely, outward movement of the hose from the sleeve is effectively prevented. Continued inward movement of the tubular member 16 from the position shown in FIGURE 5 wherein the minor diameter end of the frusto-conical surface 34 is disposed adjacent the flange 20 will cause the frusto-conical surface 34 to engage the flange and to effect a radially outward expansion of the flange 20, as shown in FIGURE 6. The radial outward expansion is within the elastic limit of the material and hence it is of considerable importance to the present invention that at least the flange portion of the outer sleeve 14 be of a material which is capable of a substantial amount of deformation within the elastic limit of the material. This essential characteristic is clearly demonstrated by the preferred materials mentioned above. Thus, with continued inward movement of the tubular member 16, the flange will engage the large diameter end of the frusto-conical surface and reach its maximum radially outward expansion after which abutment surface 38 moves into contiguous relation to the inner surface of the flange. At this point the resilience in the material will cause the same to retract within the groove defined by the surfaces 36, 38 and 40. The term resilient as herein applied refers to a material of the type previously mentioned which is capable of a substantial amount of deformation within the elastic limit of the material.

It can thus be seen that the final securement of the fitting of the present invention is obtained by a resilient retracting action or snap action of the flange 20 engaging within the groove. With the fitting thus secured there is provided not only an effective securement of the hose end between the sawtooth-type irregular surfaces provided by the ridges 20 and 32 but an effective hydraulic seal to the extremity or edge of the hose end. This seal is of considerable importance when dealing with reinforced hose in which the reinforcing is provided by elongated fibrous strands. If the exposed ends of the strands contiguous with the extremity of the hose are allowed to become exposed to water or other moisture conditions, the strands through a wicking or capillary action tend to absorb such water or moisture, and to lose their effectiveness over a relatively short period of use. The sealing of the extremity of the hose end prevents this action from taking place.

It will also be understood that while the method of securement of the present fitting has been disclosed in conjunction with special equipment, that it would be possible to effect this securement with conventional manual tools. In any event, the equipment required is very simple and inexpensive and does not embody the intricate and more expensive mechanisms which are involved in effecting a direct radially outward expansion of an inner member or the direct radially inward compression of an outer member. Of primary significance, however, is the fact that the enitre coupling can be made of relatively inexpensive molded plastic components which provide a greater corrosive resistance than metallic materials while at the same time giving a more pleasing appearance.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

It is claimed:
1. A method of securing to the end of a hose a fitting of the type including an outer sleeve having an inwardly extending annular flange at one end and an inner tubular member having an exterior recess for receiving said flange which comprises the steps of engaging said sleeve over the hose end, effecting a relative rectilinear movement between the hose end with said sleeve engaged thereover and said member in a direction to engage said member within said hose end to expand the hose outwardly into pressure tight engagement with said sleeve until said flange is disposed in spaced relation to said recess, and then continuing said relative movement while progressively expanding said flange outwardly within the elastic limit thereof and then allowing said flange to contract into said recess.

2. A method as defined in claim 1 wherein said sleeve is engaged over the hose end with the flange in substantial abutting relation to the extremity of the hose end.

References Cited
UNITED STATES PATENTS

| | | |
|---|---|---|
| 2,392,085 | 1/1946 | Ferrel. |
| 2,410,600 | 11/1946 | Cowles _____ 285—256 |
| 2,889,089 | 6/1959 | Herrick, et al. |
| 2,947,071 | 8/1960 | Marchant _____ 29—453 X |
| 2,985,469 | 5/1961 | Bowman. |
| 3,129,020 | 4/1964 | Bujnowski. |
| 3,165,338 | 1/1965 | Moss _____ 285—256 |
| 3,217,400 | 11/1965 | Dllesy et al. _____ 29—453 |

CHARLIE T. MOON, *Primary Examiner.*